(12) United States Patent
Wasas et al.

(10) Patent No.: US 11,040,874 B1
(45) Date of Patent: Jun. 22, 2021

(54) PROCESS AND DEVICE FOR CONVERTING HYDROGEN SULFIDE INTO HYDROGEN GAS AND SULFUR

(71) Applicant: Standard Hydrogen Company, Inc., Boca Raton, FL (US)

(72) Inventors: James Wasas, Aurora, OH (US); Mariavicenta Wasas, Aurora, OH (US)

(73) Assignee: Standard Hydrogen Company, Inc., Boca Raton, FL (US)

( * ) Notice: Subject to any disclaimer, the term of this patent is extended or adjusted under 35 U.S.C. 154(b) by 0 days.

(21) Appl. No.: 16/905,204

(22) Filed: Jun. 18, 2020

Related U.S. Application Data (60) Provisional application No. 62/992,477, filed on Mar. 20, 2020.

(51) Int. Cl.
| | | |
|---|---|---|
| C01B 3/04 | (2006.01) | |
| C01B 3/50 | (2006.01) | |
| C01B 17/04 | (2006.01) | |
| C01B 17/02 | (2006.01) | |
| B01J 6/00 | (2006.01) | |
| B01D 53/32 | (2006.01) | |
| B01D 53/22 | (2006.01) | |
| B01D 71/04 | (2006.01) | |
| B01D 71/36 | (2006.01) | |

(52) U.S. Cl.
CPC .............. *C01B 3/04* (2013.01); *B01D 53/225* (2013.01); *B01D 53/229* (2013.01); *B01D 53/32* (2013.01); *B01D 71/04* (2013.01); *B01D 71/36* (2013.01); *B01J 6/008* (2013.01); *C01B 3/503* (2013.01); *C01B 17/021* (2013.01); *C01B 17/0495* (2013.01); *C01B 2203/041* (2013.01)

(58) Field of Classification Search
CPC ... C01B 3/04; C01B 2203/041; C01B 17/021; C01B 3/503; C01B 17/0495; B01D 53/225; B01D 53/32; B01D 71/04; B01D 53/229; B01D 71/36; B01J 6/008
See application file for complete search history.

(56) References Cited

U.S. PATENT DOCUMENTS

| | | |
|---|---|---|
| 2,979,384 A | 4/1961 | Weiner |
| 3,158,439 A | 11/1964 | Bauman |
| 3,962,409 A | 6/1976 | Kotera et al. |
| 4,197,277 A | 4/1980 | Sugier |
| 5,204,082 A | 4/1993 | Schendel |
| 5,306,475 A | 4/1994 | Fichtel et al. |
| 5,397,556 A | 3/1995 | Towler |
| 6,099,819 A | 8/2000 | Srinivas |
| 7,163,670 B2 | 1/2007 | Agarwal |
| 7,455,828 B2 | 11/2008 | Selinger |
| 7,718,152 B2 | 3/2010 | Stenger |
| 9,290,386 B2 | 3/2016 | Wasas |
| 2002/0023538 A1 | 2/2002 | Argawal |

(Continued)

OTHER PUBLICATIONS

International Search Report for parallel application PCT/US20/61311, dated Feb. 12, 2021.

(Continued)

*Primary Examiner* — Anthony J Zimmer
*Assistant Examiner* — Syed T Iqbal
(74) *Attorney, Agent, or Firm* — William Gray Mitchell (57) ABSTRACT

A reactive process for converting hydrogen sulfide into hydrogen gas and sulfur and a reactor for effecting such process.

16 Claims, 4 Drawing Sheets

(56) References Cited

U.S. PATENT DOCUMENTS

| | | | |
|---|---|---|---|
| 2009/0263312 A1* | 10/2009 | Wasas | ................ C01B 17/0465 423/461 |
| 2012/0076721 A1 | 3/2012 | Wasas | |
| 2013/0143972 A1 | 6/2013 | Townsend et al. | |
| 2017/0297913 A1* | 10/2017 | Cronin | ..................... C25B 5/00 |
| 2018/0297004 A1 | 10/2018 | Jaffrey | |

OTHER PUBLICATIONS

Written Opinion of the ISA for parallel application PCT/US20/61311, dated Feb. 12, 2021.

\* cited by examiner

PROCESS AND DEVICE FOR CONVERTING HYDROGEN SULFIDE INTO HYDROGEN GAS AND SULFUR

CROSS REFERENCE TO RELATED APPLICATIONS

This application claims priority to U.S. provisional patent application 62/992,477, filed on Mar. 20, 2020 and incorporated herein by reference.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a process and a reactor for converting hydrogen sulfide into hydrogen gas and sulfur.

Background of the Invention

Hydrogen may be found in nature in the elemental form, typically in trace amounts because hydrogen is very reactive. Hydrogen is a desirable fuel because it is clean-burning, in that its combustion produces only water and that it has the highest energy density of any fuel on earth. Currently, only two commercial methods are used for the mass production of hydrogen, the steam reformation of methane and the hydrolysis of water. Both known methods are expensive, inefficient, and often produce unwanted carbon dioxide as well.

Hydrogen sulfide is produced in very large quantities by petroleum refineries because hydrogen sulfide occurs as a natural contaminant in underground wells and it must be separated from the oil and gas before the petroleum products can be sold. Many natural gas wells were drilled and then capped because the concentration of hydrogen sulfide was considered to be too high to be refined profitably. Such wells are known as "sour gas" wells and can have as much as 90% hydrogen sulfide content.

Hydrogen sulfide is also produced at petroleum refineries during the hydrogenation process, which is used to remove sulfur from hydrocarbons to convert them into hydrocarbons that do not contain sulfur so that they can be clean burning. Hydrogen sulfide is also produced by many industrial processes such as paper pulping, sewage treatment, reacting sulfur with hydrocarbons, and is also produced naturally by decaying organic matter and in sulfur hot springs.

Hydrogen Sulfide is a colorless, corrosive, and highly toxic gas with an offensive rotten egg odor. Hydrogen sulfide's odor is readily detectable at low concentrations and it is a respiratory inhibitor, but because of its abundance and high flammability, it could serve as a fuel but for the sulfur dioxide produced during its combustion. However, a method to split hydrogen sulfide apart to create hydrogen to fuel the emerging hydrogen economy and while also creating usable sulfur would be highly desirable.

Processes to remove hydrogen sulfide from gases are known. For example, hydrogen sulfide may be separated from gases by means of solvent extraction, adsorption, absorption or other means. Processes to recover sulfur from hydrogen sulfide are also known. For example, in a conventional sulfur recovery process, known as the Claus Process, up to about one third of the hydrogen sulfide in a gas may be oxidized with air or oxygen into sulfur dioxide to react with the balance of the hydrogen sulfide and produce elemental sulfur and water. Part of this process is accomplished at temperatures above 850 degrees Celsius, and part is accomplished in the presence of catalysts, such as activated alumina or titanium dioxide. The chemical reactions of the Claus Process are:

$$2H_2S + 3O_2 \rightarrow 2SO_2 + 2H_2O$$

$$4H_2S + 2SO_2 \rightarrow 3S_2 + 4H_2O$$

Frequently, the sulfur produced is of low quality, must be refined before it can be sold or used commercially, and the water is contaminated.

Another process is disclosed in U.S. Publication No. 2005/0191237. This publication discloses a process and apparatus for obtaining a hydrogen product and a sulfur product from a feed gas by separating the feed gas to obtain a purified hydrogen sulfide fraction of at least about 90% by volume hydrogen sulfide, dissociating the hydrogen sulfide in the hydrogen sulfide fraction to convert it into a purified hydrogen sulfide fraction of elemental hydrogen and sulfur, separating the dissociated purified hydrogen sulfide fraction to obtain a hydrogen rich fraction of elemental hydrogen, and obtaining the hydrogen product of elemental hydrogen. The dissociating is performed at a temperature of between 1500 and 2000 degrees Celsius.

U.S. Publication No. 2002/0023538 also discloses a process to remove hydrogen sulfide and other contaminants. This two-step process includes using a first adsorbent positioned in a fluidized bed operating at a temperature of about 20-60 degrees Celsius to remove at least a portion of the contaminants and using a second adsorbent positioned within another fluidized bed operating at a temperature of about 100-300 degrees Celsius to remove another portion of the contaminants from a gas. A conversion element, i.e., a nonthermal plasma corona reactor, is also disclosed for converting the contaminants to elemental sulfur and hydrogen at a temperature less than 400 degrees Celsius.

What is needed is a simple, efficient and cost-effective method of splitting hydrogen sulfide to produce fuel-quality hydrogen gas and a sulfur byproduct suitable for use or sale.

BRIEF SUMMARY OF THE INVENTION

In a preferred embodiment, substantially all of the hydrogen produced during the decomposition of hydrogen sulfide travels from the area of higher pressure on the heated side of the membrane where the hydrogen sulfide is present through the hydrogen-permeable membrane into an area of substantially lower pressure from which the hydrogen can freely leave the reactor. The splitting of hydrogen sulfide into its component parts of hydrogen and sulfur is endothermic thus adequate energy in any form must be supplied to the reactor in the heated area of the membrane to afford rapid decomposition of the hydrogen sulfide. The sulfur liberated in the splitting of hydrogen sulfide will be drawn to the substantially cooler part of the reactor, the condensation zone, where the temperature will be maintained within a zone of free flow of sulfur for removal as a liquid, or at a temperature where sulfur is viscous or solid for removal by mechanical means. The preferred embodiment will also maintain a positive electrical charge within the condensation zone and a negative electrical charge within the low pressure hydrogen side of the hydrogen-permeable membrane.

For production scale embodiments, a passage-way will be provided to purge the reactor of gases that will not react to produce hydrogen, such as methane, carbon dioxide, nitrogen, water vapor, and so on, which are contaminants in the hydrogen sulfide entering the reactor. If allowed to fill the reactor without the ability to remove the contaminants, the splitting reaction will slow and eventually stop because the reactor will be filled with non-reactive contaminants and raw material hydrogen sulfide will be exhausted.

In a preferred embodiment, a process for producing hydrogen from an input gas stream primarily comprising hydrogen sulfide, said process comprising: a. passing the input gas stream into an optionally positively charged electrically conductive reactor chamber, wherein the reactor chamber has an outer wall defining an interior chamber, said interior chamber including a heating zone, hydrogen-permeable inorganic, organic, or composite membrane with an optionally negatively charged conductor within the low pressure side of the membrane, and a sulfur condenser within the high pressure hydrogen sulfide side, said reactor comprising: i. an inlet for introducing the input gas stream into the interior chamber; ii. the heating element disposed nearby or inside the high pressure interior chamber to heat said input gas stream; iii. said membrane being positioned at the entrance to a first outlet from the interior chamber and permeable to hydrogen but impermeable to hydrogen sulfide, sulfur vapor, and other gases that may be components of the input gas stream, such membrane having a low pressure outlet side and an interior chamber side; iv. said membrane comprising an optionally negatively charged material located at the flow passageway; and v. an inner surface of the high pressure outer wall serving as a sulfur condenser inside the interior chamber, such inner surface directing condensed sulfur towards and into a second outlet; b. reacting the hydrogen sulfide in an area surrounding the heating element at temperature between about 100° Celsius and about 700° Celsius wherein a conversion of hydrogen sulfide to hydrogen gas and sulfur vapor is at least about 95%; c. continuously and immediately removing the hydrogen gas through the membrane and withdrawing the hydrogen from the first outlet; and d. continuously condensing the sulfur vapor on the inner surface of the outer wall or similar condensing surface placed within the reactor and removing the sulfur through the second outlet.

In another preferred embodiment, the process as described herein, wherein the reactor chamber includes one or more reactor chambers in series.

In another preferred embodiment, the process as described herein, wherein the reactor chamber is operated at a pressure ranging from sub-atmospheric pressure up to 3,000 psi (20,684 kPa).

In another preferred embodiment, the process as described herein, wherein the membrane is a hydrogen-permeable organic polymer membrane, one side of which is maintained at a pressure lower than the pressure on the hydrogen sulfide side of the membrane.

In another preferred embodiment, the process as described herein, wherein the membrane is a hydrogen-permeable inorganic membrane, one side of which is maintained at a pressure lower than the pressure on the hydrogen sulfide side of the membrane.

In another preferred embodiment, the process as described herein, wherein the membrane is hydrogen-permeable, consists of both organic and inorganic components, one side of which is maintained at a pressure lower than the pressure on the hydrogen sulfide side of the membrane.

In another preferred embodiment, the process as described herein, comprising two or more membranes.

In another preferred embodiment, the process as described herein, wherein the negatively charged conductor is an electrically conductive thermocouple or an electrical conductor of other composition located within the low hydrogen side of the hydrogen permeable membrane.

In another preferred embodiment, the process as described herein, wherein the reactor chamber where the feed gases are fed is positively charged.

In another preferred embodiment, the process as described herein, wherein the conversion of hydrogen sulfide comprises at least about 99%.

In another preferred embodiment, the process as described herein, wherein the reactor contains effluent gas comprising less than about 10,000 ppm hydrogen sulfide.

In another preferred embodiment, the process as described herein, further comprising wherein the heating element is located adjacent to the membrane.

In another preferred embodiment, the process as described herein, further comprising wherein a magnetron or other electromagnetic energy field generator for heating the hydrogen sulfide gas is located in the heating zone adjacent to the membrane or membranes.

In another preferred embodiment, the process as described herein, wherein the inner surface of the outer walls, or one or more heat exchange condensers collect sulfur vapor for removal from the reactor.

A reactor for the continuous conversion of hydrogen sulfide to hydrogen gas and sulfur in one or more optionally positively charged reactor chamber(s), said reactor chamber(s) having an outer wall with an inner surface defining an interior chamber, said interior chamber(s) including a heating element(s) and a membrane(s), said reactor chamber(s) having: i. an inlet for introducing the hydrogen sulfide stream into the interior chamber; ii. the heating element(s) comprising a resistance wire(s) or electromagnetic energy source and disposed in the interior chamber to heat said hydrogen sulfide stream; iii. said membrane(s) being disposed in the interior chamber, said membrane(s) being permeable to hydrogen but impermeable to hydrogen sulfide, sulfur vapor and other gases that may be present in the hydrogen sulfide; iv. said membrane(s) having a membrane surface defining a flow passageway in communication with a first outlet and comprising an optionally negatively charged conductor located within such flow passageway; and iv. the optionally positively charged inner surface of the outer wall or optionally positively charged heat exchange condensers serving as a sulfur condenser inside the interior chamber, such inner surface directing condensed sulfur towards and into a second outlet.

In another preferred embodiment, the reactor as described herein, wherein the continuous conversion of hydrogen sulfide comprises at least about 99%.

In another preferred embodiment, the reactor as described herein, further comprising one or more sulfur condensers embodied as thermally conductive tubes.

In another preferred embodiment, the reactor as described herein, further comprising wherein the heating element is located in close proximity to the hydrogen permeable membrane.

In another preferred embodiment, the reactor as described herein, further comprising a vacuum pump or other means to remove oxygen, methane, and other unwanted unreactive gases from the interior chamber.

In another preferred embodiment, the reactor as described herein, further comprising a covering with insulating and temperature controlling properties comprising interior heat exchange coils, such covering located at the outer wall.

DETAILED DESCRIPTION OF THE INVENTION

The invention provides a process for splitting hydrogen sulfide ($H_2S$) to form products hydrogen gas ($H_2$) and sulfur ($S_8$). In the inventive reactive process, hydrogen sulfide gas will have already been isolated through one or more industrial or utility processes and gathered for separate reaction. This waste product will thus have become a useful reactant for generating hydrogen fuel.

Once the hydrogen sulfide is isolated, it may then be simply reacted by the following endothermic chemical reaction which requires a small energy input:

$$8H_2S(g) \rightarrow 8H_2(g) + S_8(s)$$

In this reaction, the product $S_8$ is octasulfur, an inorganic chemical that is yellow, odorless and tasteless when pure. Octasulfur may exist in liquid or solid form. It is the most common allotrope of sulfur and the most commonly used industrial and pharmaceutical form of sulfur. Sulfur exists in other allotropes and can be produced and withdrawn from the reactor in any allotrope in which it is produced.

The reactor may be made of any material such as metal, ceramic, glass, polymer or any other material known to withstand the temperatures, pressures, and chemicals contained inside the reactor. Temperature and pressure may be measured by any means suitable. Product liquid sulfur may be drained from the reactor, used within the reactor to produce more hydrogen sulfide or converted to solids that can be collected and removed from the reactor by any means. The hot hydrogen gas that passes through the hydrogen-permeable membrane may pass through a heat exchanger to pre-heat the hydrogen sulfide entering the reactor, if needed, or be used for other purposes. The equipment is not limited to that described in the application. Any equipment may be used as long as it performs the steps of the process.

A heating element is provided in the reactor to produce a heating zone. The heated element may be any element or device that provides thermal or electromagnetic energy, but preferably is a resistance wire for small scale use. No catalyst is required for the subject reaction, but a catalyst may improve the performance of the reactor.

Preferably, the pressure of the reactor ranges from atmospheric pressure up to 3,000 psi (20,684 kPa). Higher pressures may also be employed, where applicable, to improve the reaction; sub atmospheric pressures will also work. The reactor in its simplest form comprises a combination hydrogen-permeable membrane heating element, optionally embodied as a tube with one end open around which a resistance wire is wound, producing a heated area of a temperature of 50 C-700 C. In this embodiment, the nichrome heating element acts as a catalyst. Sulfur and hydrogen separate from the gas stream at the heated area. The decomposition reaction of hydrogen sulfide in the gas occurs over a wide range of temperatures starting at about 50 degrees C. When the sulfur is above its melting point, it will collect on the sides of the walls of the reactor, as the walls of the reactor are cooler than the heated area, and run down the sides of the walls of the reactor if the reactor walls are at a temperature where sulfur is a free-flowing liquid.

A resistance wire composed of nichrome or other catalytic material may be used and act as a catalyst to split the hydrogen sulfide gas, higher temperatures are usually preferred. Preferably, the temperature of the heated area is 100 degrees to 700 degrees Celsius, depending on the reactor pressure and the composition of the hydrogen-permeable membrane. Higher or lower temperatures may also be employed.

During the process of the invention, hydrogen sulfide is converted to hydrogen and sulfur and, preferably, elemental hydrogen and elemental sulfur. Rapid separation of the hydrogen from the gases is preferred so that the liberated hydrogen does not react with the sulfur. For that reason, the pressure past the hydrogen-permeable membrane where the hydrogen goes should always be lower than the pressure of the hydrogen sulfide side of the hydrogen-permeable membrane.

The hydrogen gas generated by the process of this invention can be separated from the reaction products by conventional membrane technology or other means. In one iteration, the membrane is an inorganic ceramic or glass with a membrane interior defining a flow passageway in communication with a first outlet and comprising a negatively charged conductor located at such flow passageway. Such negatively charged conductor, in one embodiment, is a stainless-steel thermocouple, mesh, or rod and when combined with the positively charged interior walls of the reactor it will substantially increase the flow of newly liberated hydrogen gas through the hydrogen-permeable membrane of the reactor. This flow rate increase will both increase the time efficiency of the reactor and also decrease the chance of hydrogen gas reacting with sulfur within the reactor.

In a preferred embodiment, for lower temperature reactions, the hydrogen permeable membrane is comprised of an organic polymer such as Nafion®, a brand name for a sulfonated tetrafluoroethylene based fluoropolymer-copolymer, synthetic polymers with ionic properties resulting from the incorporation of perfluorovinyl ether groups terminated with sulfonate groups into a PTFE backbone. Nafion is known to have excellent thermal and mechanical stability and can be manufactured with varying cationic conductivities. Other similar proton conductive polymers can also be employed.

Alternatively, for higher-temperature reactions, the hydrogen permeable membrane is comprised of a dense inorganic material such as a ceramic with very limited porosity, as is known in the fossil fuel industry's hydrogen separation processes. Proton permeable ceramics containing alkaline-earth cerates and zirconates such as barium cerate, barium zirconate, and strontium cerate, for example, are also suitable inorganic membrane materials and they can be used alone or coated on a substrate of porous ceramic, metal or other supporting framework. A hybrid of Nafion, or similar proton conductive organic polymers, on a substrate of porous organic or inorganic substrate could also be used.

The process of oxidizing the liberated hydrogen gas produced by the decomposition of hydrogen sulfide with air or oxygen is represented by the following equation:

2H.sub.2(g)+O.sub.2(g).fwdarw.2H.sub.2O(g)+energy

The energy released in this hydrogen oxidation process is nearly 12 times that required in the first reaction where hydrogen is released from its bond with sulfur as can be seen in the following table:

| Reactant | Reactant | Product | Product | Enthalpy (delta H) kj/mole | Gibbs Free Energy (AG) | Spontaneous T (K) |
|---|---|---|---|---|---|---|
| H$_2$S | | H$_2$(g) | S(s) | 20.2 | 33.0 | −468.7 |
| 2H$_2$(g) | O2(g) | 2H$_2$O(g) | | −483.7 | −457.2 | 5449.0 |

The disclosed reactions result in the production of industrially and commercially useful and valuable pure hydrogen gas and sulfur. The disclosed reactor design allows for such production to be simple and efficient, with the simplicity of the design also allowing for highly scalable production capacity. Moreover, the disclosed process is inexpensive compared to methodology currently known in the field, such that a production system with multiple reactors based on the disclosed design may produce large amounts of hydrogen and sulfur for commercial use at prices well below those available on the market today.

DETAILED DESCRIPTION OF THE FIGURES

Figure 1:
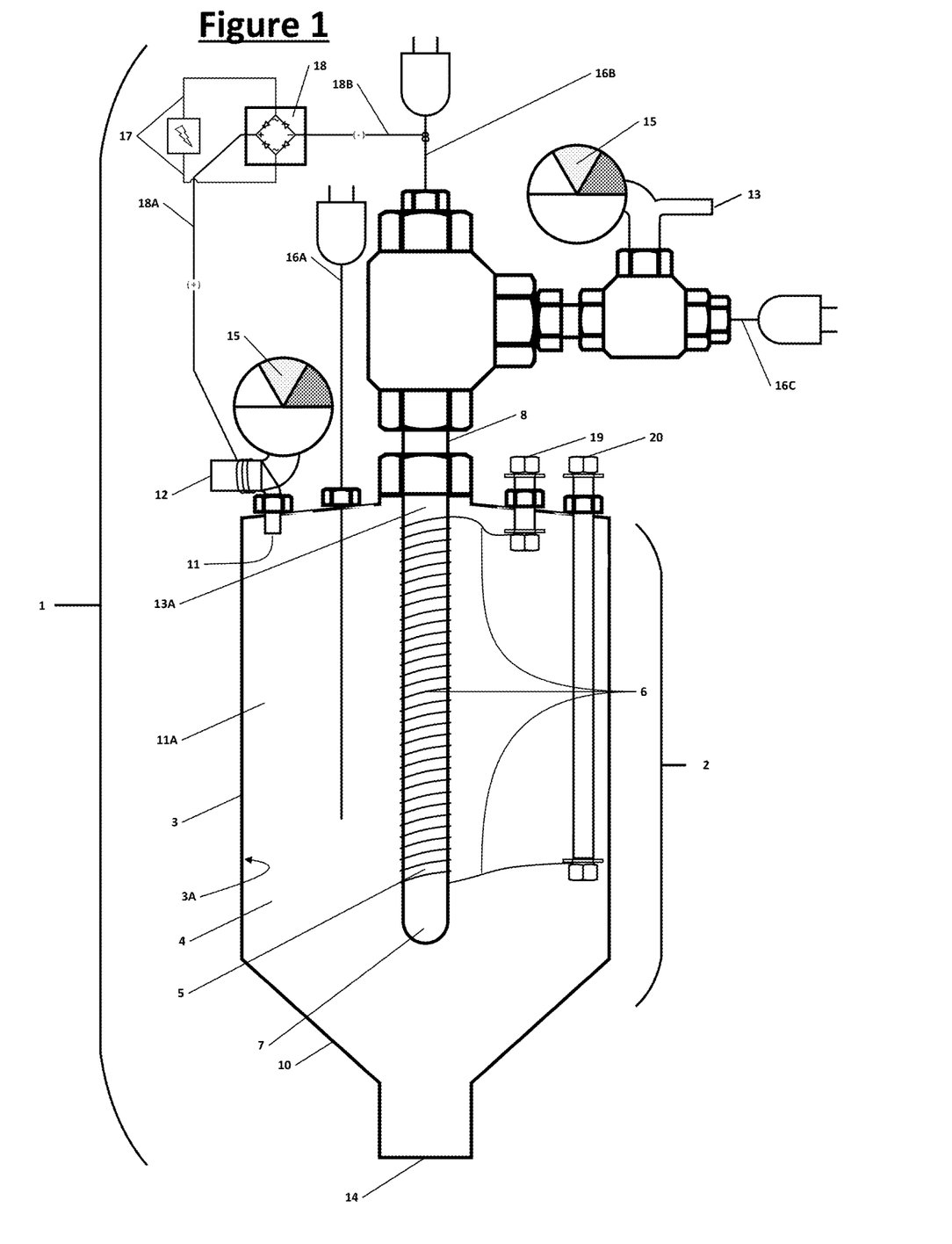
FIG. 1 is a line drawing evidencing a perspective view of a small exemplary reactor used in the inventive process.

Turning now to the figures, FIG. 1 is a perspective view of an exemplary reactor 1 used in the inventive hydrogen production process. In this embodiment, the reactor may be included as a part of a hydrogen sulfide generator or container (not pictured) or attachable to the generator or container by a hose or other apparatus to provide the hydrogen sulfide gas. A flow of hydrogen sulfide passes through an inlet 12 with a pressure gauge 15, which gauge also acts as a valve, into a reactor chamber 2 comprising an outer wall 3 with an inner surface 3A of the outer wall that defines an interior chamber 4 within which the reaction will occur. The reactor chamber is resistant and impermeable to hydrogen, sulfur, hydrogen sulfide, contaminants that may enter with the hydrogen sulfide, and is optionally a positively charged electrical conductor. As the hydrogen sulfide fills the interior chamber by way of inlet 11, it creates an area of high pressure 11A and approaches a heating element 5, embodied as a one-end open tube-shaped hydrogen-permeable ceramic membrane 7, around which is wound a resistance wire 6, which wire extends to each of a first electrical feed-through conductor 19 and second electrical feed-through conductor 20. The heated area surrounding the heating element, if raised to a temperature of about 100° C. to about 700° C. or more, will provide the energy necessary to decompose the hydrogen sulfide in the interior chamber 4, splitting it into hydrogen gas and sulfur. Preferably, the temperature of the heating element will be 115° C. to 650° C., with the ideal temperature being 140° C. to 600° C. A thermocouple 16A will also be inserted into the interior chamber 4 to measure the temperature in the area near the heating element.

The heating element is preferably located near to or is a part of the hydrogen-permeable membrane 7, which membrane is also impermeable to hydrogen sulfide, sulfur, and other gases that may be contaminating the hydrogen sulfide. High purity hydrogen gas will then move through the hydrogen-permeable membrane 7, which may optionally comprise a centrally located, negatively-charged material 8 located within the area of low pressure 13A. The negative charge can be carried by another thermocouple 16B placed within the membrane to measure the temperature of the hydrogen-permeable membrane, or by any other means of conducting the negative charge of current to the interior of the membrane In a preferred embodiment, the negatively-charged material is embodied as an electrically conductive mesh, sintered tube, porous graphite, or similar porous conductor. The negative charge from such material will attract the positively-charged hydrogen protons more rapidly through the membrane and out of the reactor chamber 2 when the reactor chamber itself is a positively-charged conductor, being made of metal, graphite or similar material resistant to heat, pressure and chemical reaction. Once through the membrane 7, the hydrogen gas will proceed out of the reactor and to a container (not pictured) through a first outlet 13, optionally comprising a pressure gauge 15 and a thermocouple 16C for sensing the temperature of the hydrogen outflow. Knowledge of the temperature of the hydrogen departing the reactor will allow the use of the thermal energy contained in the hydrogen gas to be used, for example, to pre-heat the hydrogen sulfide entering the reactor, or for other uses such as heat recovery. The DC current can be provided by a conventional rectifier shown as 18, which is connected to an AC power source by way of 17, by batteries, by hydrogen fuel cells, or by any other means.

Sulfur vapor, as the other product of the reaction of hydrogen sulfide with the heating element, will remain in the interior chamber 4 and gradually condense into liquid sulfur on the inner surface 3A of the outer wall 3. In one iteration, the outer wall is wrapped in a silicon pad 21 (not pictured) to stabilize the wall temperature within the range desired to produce liquid or solid sulfur, and the wall may comprise heating or cooling elements to effect a higher rate of sulfur condensation. As the condensation forms, gravity will pull the condensation downward along the inner surface 3A and towards a second outlet 14, such outlet intended to drain the liquid sulfur from the reactor. In a preferred embodiment, the temperature of inner surface 3A will be maintained between about 115° C. to about 135° C. for a low temperature environment reactor, or for a high temperature environment reactor, the temperature of inner surface 3A will be maintained between about 380° C. to about 440° C.

In another preferred embodiment, the second outlet 14 is located within a sloped area 10 of the outer wall 3, wherein the sloped area aids in conducting the condensed liquid sulfur towards the second outlet 14. Sulfur may be collected in an appropriate vessel (not pictured) once it has drained from the reactor, or used as is, for example, to generate additional hydrogen sulfide in a reaction with waste hydrocarbons within the reactor.

The resistance wire 6 is powered by either AC or DC current brought to it by means of the electrically insulated feed-throughs 19 and 20. A second hydrogen permeable membrane (not pictured) may optionally be used for a second level of filtration, as needed, for further removal of the hydrogen sulfide. In addition, a bed of hydrogen sulfide absorbent material (not pictured) may optionally be used for trace hydrogen sulfide removal.

Performance of the reaction may be more efficient in a high-pressure environment, as governed by the pressure of the gas inflow at the inlet. Optimum pressure inside the reactor is preferably between sub-atmospheric pressure up to 3,000 psi (20,684 kPa) depending on the temperature of the reactor.

Figure 2:
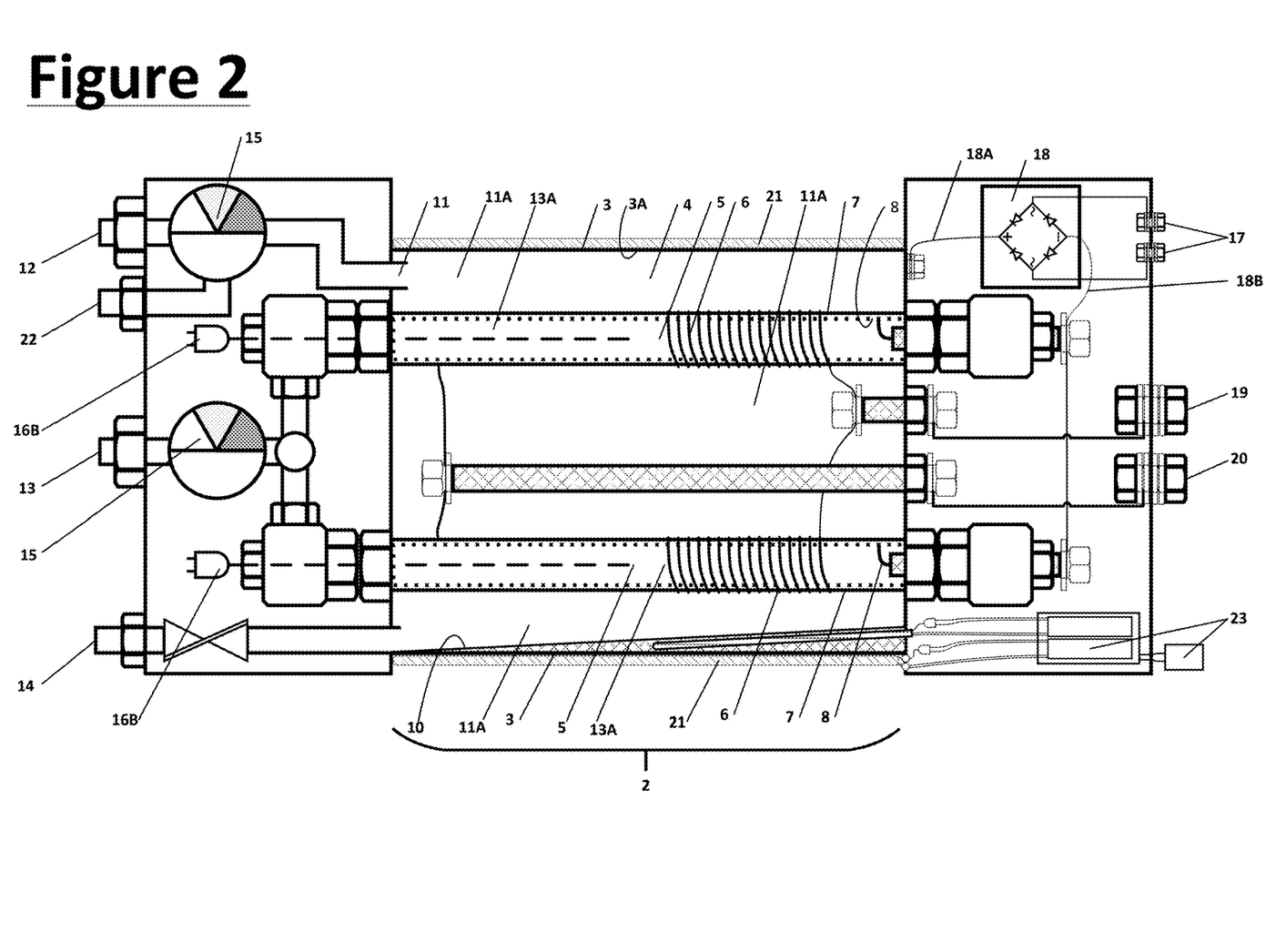
FIG. 2 is a line drawing evidencing an alternate view of a larger exemplary reactor used in the inventive process.

FIG. 2 is an alternate version of the reactor of FIG. 1, with a horizontal configuration and a larger scale for reaction of a larger amount of hydrogen sulfide per minute. In addition to the features of FIG. 1, the embodiment of FIG. 2 includes a pressure gauge 15 at the inlet 11, creating an area of high pressure 11A, which gauge also serves as a three-way valve. The pressure gauge is thus capable of purging the interior chamber 4 when it contains a low level of hydrogen sulfide, for example 10,000 ppm or less, resulting in a drop in reaction efficiency. Both manual purging and automatic purging are disclosed, the latter triggered upon a valve opening triggered by a flow rate sensor or similar arrangement.

FIG. 2 further includes two separate combination heating elements 5 and hydrogen-permeable membranes 7, each comprising a resistance wire 6 connected to a first electrical feedthrough conductor 19 and second electrical feedthrough conductor 20. The two heating elements together provide an enlarged heated area to augment the reaction of splitting hydrogen sulfide into hydrogen gas and sulfur, and an augmented area of hydrogen-permeable membrane. The embodiment further comprises a separate multiple membrane 7 for each heating element, interconnected and leading to a pressure gauge 15 and into the first outlet 13 from the area of low pressure 13A (the thermocouple for sensing the temperature of the hydrogen gas leaving the reactor is not shown, and the thermocouple for sensing the temperature of the gases near the heating elements is not shown). The pressure gauge also serves as a valve to shut off hydrogen outflow when the reactor shuts down. An optional vacuum pump (not pictured) may also be located on or connected to the reactor to purge the reactor of gases that will not react to produce hydrogen such as the methane, carbon dioxide, nitrogen, water vapor, and so on, which are contaminants in the hydrogen sulfide entering the reactor.

Also present in the embodiment of FIG. 2 is a low temperature silicon pad 21 wrapped around the outer wall 3 of the reactor. The silicon pad or other insulating and temperature controlling covering such as mineral wool with interior heat exchange coils and temperature control 23 are designed to maintain the sulfur condensing inner surface within the desired temperature range.

Due to the horizontal configuration of the reactor chamber 2, each of the first outlet 13 for hydrogen gas and second outlet 14 for liquid sulfur are located on the side of the reactor. The outer wall 3 of the reactor comprises an inner surface 3A, which inner surface is angled on at least one side towards the end of the reactor chamber 2 where the outlets 13 and 14 are located. This angle causes liquid sulfur condensation to run towards the second outlet 14.

Figure 3:
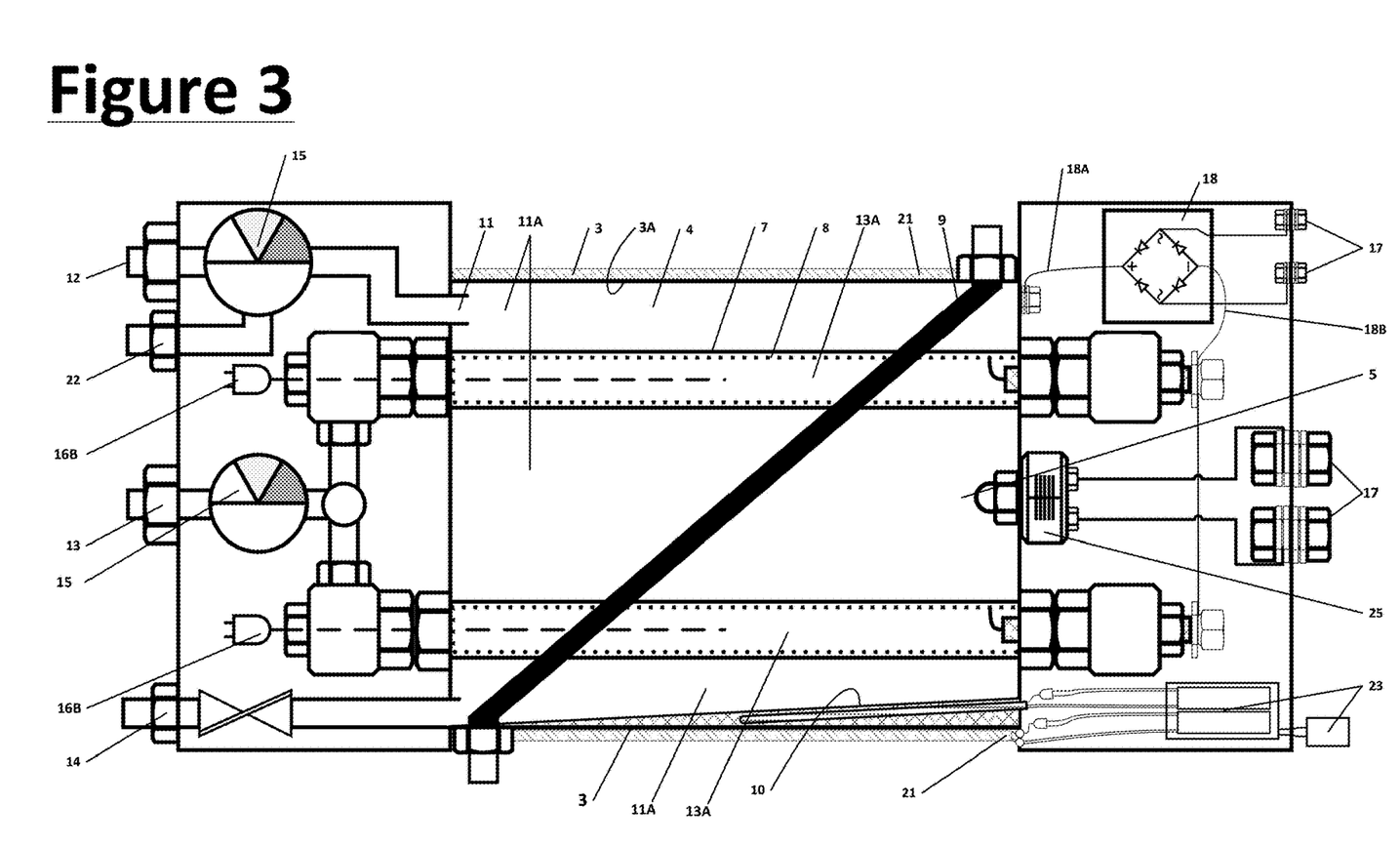
FIG. 3 is a line drawing evidencing an alternate view of an exemplary reactor where the energy supplied and necessary for the endothermic decomposition reaction is supplied by a magnetron microwave generator, which is one example of an electromagnetic energy source.

FIG. 3 is an alternate version of the reactor of FIG. 2 in which the energy necessary for the endothermic decomposition of hydrogen sulfide is generated with electromagnetism, in this case, by the use of a conventional magnetron 25 creating an area of high energy 5 and powered by AC cord 17. This eliminates the use of the resistance wire 6 and its electrical feedthroughs 19 and 20. Also shown is a freestanding sulfur condenser 9, separate from the inner surface of the outer wall, a plurality of which may be installed within the reactor as needed for a typical large scale reactor with multiple hydrogen-permeable membranes, which would thus require a much larger condensing surface than the outside walls of the reactor alone could support for the large amount of sulfur gas generated within the reactor due to the intense electromagnetic energy input splitting large amounts of hydrogen sulfide. These optionally positively-charged sulfur condensers 9 are embodied as thermally conductive tubes that are resistant to the conditions present within the reactor and would circulate heat exchange liquid to control the temperature of the condensation surface.

Figure 4:
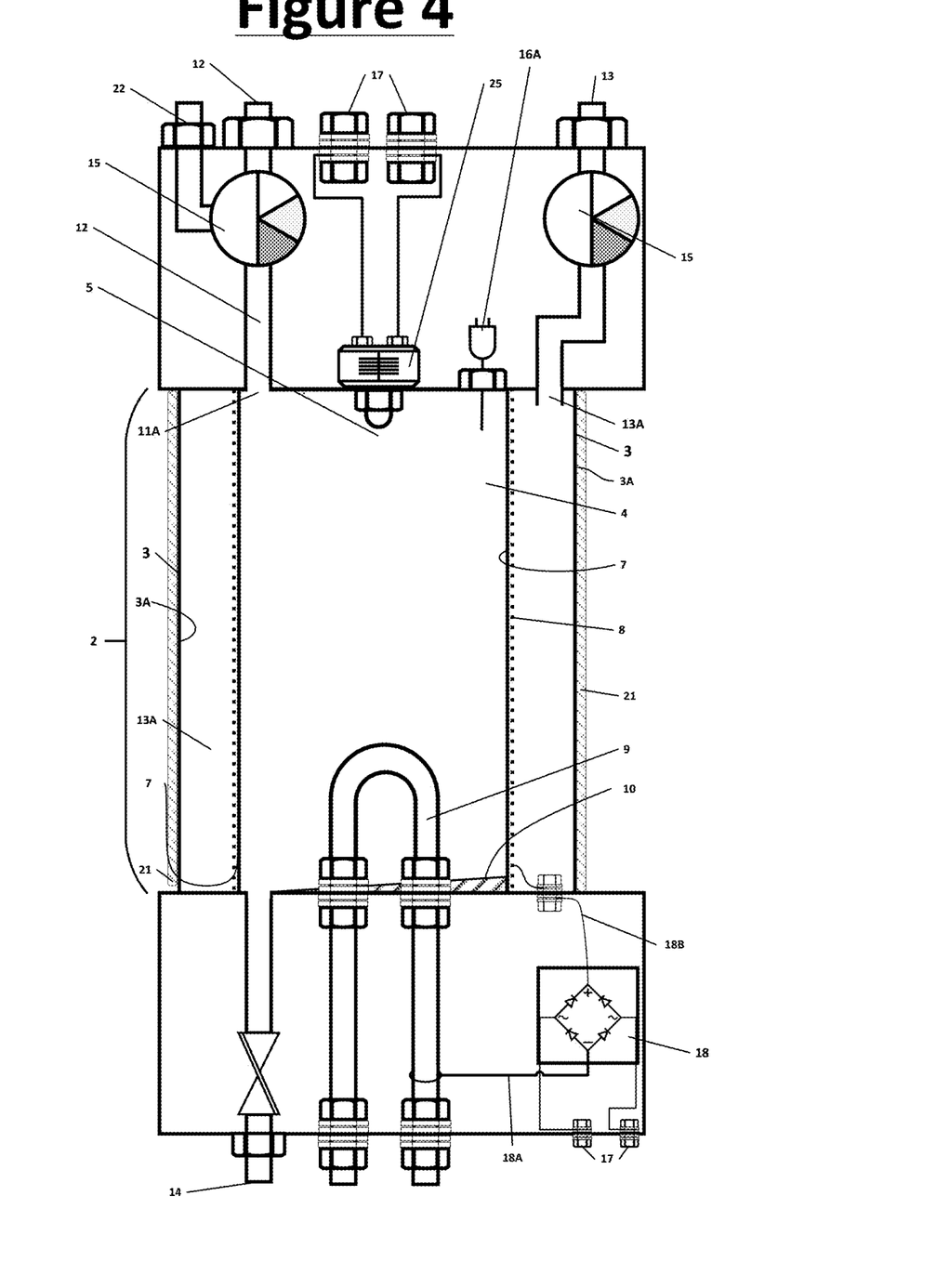
FIG. 4 is a line drawing evidencing an alternate view of an exemplary reactor where the energy supplied and necessary for the endothermic decomposition reaction is supplied by a magnetron microwave generator placed with a positively charged sulfur condenser within a large diameter hydrogen-permeable membrane.

FIG. 4 is an alternate version of the reactor of FIG. 3 in which the energy necessary for the endothermic decomposition of hydrogen sulfide is also generated with electromagnetism, but in this case, the magnetron 25 is placed within a large diameter membrane 7 creating an area of high energy 5, powered by AC cord 17, and creating an area of high pressure 11A. Also shown is a free-standing sulfur condenser 9, also placed within the high pressure hydrogen sulfide side of the membrane, a plurality of which may be installed within the reactor as needed for a typical large scale reactor with multiple hydrogen-permeable membranes. These sulfur condensers 9 are embodied as electrically and thermally conductive tubes that are resistant to the conditions present within the reactor and would circulate heat exchange liquid to control the temperature of the condensation surface, and also optionally carry a positive charge to attract the sulfur generated in the heated zone both electrically and thermally. The electromagnetic energy generator, in this case a magnetron, could be replaced with a traditional nichrome, or other type of resistance wire, heating element. Thermocouples 16B for sensing the temperature of the membrane and 16C for sensing the temperature of the hydrogen gas leaving the reactor are not shown but would typically be used.

Although the process of the invention may be performed in any apparatus or system capable of and suitable for performing each of the steps of the process as described herein, the process is preferably performed utilizing the preferred embodiments of the system as described herein. Accordingly, the terminology as used and defined in relation to one process and system is equally applicable with respect to another process and system.

While the invention has been described in detail and with reference to specific embodiments thereof, it will be apparent to one skilled in the art that various changes and modifications can be made therein without departing from the spirit and scope thereof. Thus, it is intended that the invention covers the modifications and variations of this invention provided they come within the scope of the appended claims and their equivalents.

LIST OF REFERENCE NUMBERS

1 Reactor
2 Reactor chamber
3 Outer wall

3A Inner surface of outer wall (optionally electrically charged)
4 Interior chamber
5 Heating element or area of high energy
6 Resistance wire
7 Membrane
8 Optionally negatively charged conductor inside membrane
9 Sulfur condenser
10 Sloped area
11 Inlet to interior chamber
11A Area of high pressure
12 Flow passageway
13 First outlet
13A Area of low pressure
14 Second outlet
15 Pressure gauge (multiple)
16A Thermocouple for sensing the temperature of the gases near the heating element
16B Thermocouple for sensing the temperature of the membrane
16C Thermocouple for sensing the temperature of the hydrogen gas leaving the reactor
17 AC power cord
18 Rectifier
18A Conductor for positive charge
18B Conductor for negative charge
19 First electrical feedthrough conductor
20 Second electrical feedthrough conductor
21 Silicon pad or other temperature controlling covering
22 Purge port
23 Temperature control
24 Vacuum pump
25 Electromagnetic energy generator (magnetron, etc.)

The references recited herein are incorporated herein in their entirety, particularly as they relate to teaching the level of ordinary skill in this art and for any disclosure necessary for the more common understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A process for producing hydrogen from an input gas stream primarily comprising hydrogen sulfide, said process comprising:
   a. passing the input gas stream into an optionally positively charged electrically conductive reactor chamber, wherein the reactor chamber has an outer wall defining an interior chamber, said interior chamber including a heating zone, a hydrogen-permeable inorganic, organic, or composite membrane with an optionally negatively charged conductor and a sulfur condenser, said reactor comprising:
      i. an inlet for introducing the input gas stream into the reactor chamber;
      ii. a heating element disposed inside the reactor chamber, such heating element creating a heating zone to heat said input gas stream;
      iii. said membrane being positioned at the entrance to a first outlet from the reactor chamber and permeable to hydrogen but impermeable to hydrogen sulfide, sulfur vapor, and other gases that may be contained in the input gas stream, such membrane having a first side facing the first outlet and a second side facing the interior chamber;
      iv. said membrane comprising a negatively charged material located at a flow passageway; and
      v. an inner surface of the outer wall serving as a sulfur condenser inside the interior chamber, such inner surface directing condensed sulfur towards and into a second outlet;
   b. reacting the hydrogen sulfide in the heating zone surrounding the heating element at temperature between about 100° Celsius and about 700° Celsius wherein a conversion of hydrogen sulfide to hydrogen gas and sulfur vapor is at least about 95%;
   c. continuously and immediately removing the hydrogen gas through the membrane and withdrawing the hydrogen from the first outlet; and
   d. continuously condensing the sulfur vapor on the inner surface of the outer wall and removing the sulfur through the second outlet.

2. The process of claim 1, wherein the reactor chamber includes one or more reactor chambers in series.

3. The process of claim 1, wherein the reactor chamber is operated at a pressure ranging from sub-atmospheric pressure up to 3,000 psi (20,684 kPa).

4. The process of claim 1, wherein the membrane is a hydrogen-permeable organic polymer membrane wherein the membrane's second side is maintained at a pressure lower than the pressure on the membrane's first side.

5. The process of claim 4, wherein the membrane is a hydrogen-permeable inorganic membrane.

6. The process of claim 4, wherein the membrane is hydrogen-permeable and consists of both organic and inorganic components.

7. The process of claim 1, comprising two or more membranes.

8. The process of claim 1, wherein the negatively charged conductor is an electrically conductive thermocouple or an electrical conductor of other composition located within the low pressure second side of the hydrogen permeable membrane.

9. The process of claim 1, wherein the reactor chamber is positively charged.

10. The process of claim 1, wherein the conversion of hydrogen sulfide comprises at least about 99%.

11. The process of claim 1, wherein the reactor contains effluent gas comprising less than about 10,000 ppm hydrogen sulfide.

12. The process of claim 1, further comprising wherein the heating element is located adjacent to the membrane.

13. The process of claim 1, further comprising wherein a magnetron or other electromagnetic field generator for heating the hydrogen sulfide gas is located in the heating zone adjacent to membrane or membranes.

14. The process of claim 1, wherein the inner surface of the outer wall, or further comprising one or more heat exchange condensers collect sulfur vapor for removal from the reactor.

15. The process of claim 1, wherein the inner surface of the outer wall or one or more sulfur condensers are positively charged.

16. The process of claim 1, wherein each of the inner surface of the outer wall and the one or more sulfur condensers are positively charged.

* * * * *